INVENTORS.
SHERWOOD W. McGEE
EUGENE R. ANDREOTTI
BY Parker & Carter
Attorneys.

United States Patent Office 3,459,547
Patented Aug. 5, 1969

3,459,547
METHOD OF MAKING A STRUCTURAL ALLOY STEEL CONTAINING COPPER AND OTHER ALLOY ELEMENTS
Eugene R. Andreotti, Geneva, and Sherwood W. McGee, Lisle, Ill., assignors to Burgess-Norton Mfg. Co., Geneva, Ill., a corporation of Illinois
Filed June 28, 1967, Ser. No. 650,570
Int. Cl. B22f *3/26;* C21d *1/80*
U.S. Cl. 75—208
9 Claims

ABSTRACT OF THE DISCLOSURE

This invention comprises an alloy system and method of fabrication for producing useful steel articles exhibiting tensile strengths on the order of 150,000 p.s.i. with useful ductility on the order of 1% to 2½% tensile elongation. The alloy system entails suitable metallurgical combinations of iron, carbon, copper, manganese, nickel, tin and minor elements combined through a process of copper liquefication and high temperature capillary infiltration. Ferrous constituents in the alloy group are fabricated using metal powders and powder metallurgy techniques entirely. Cuprous members of this alloy system can be either as powdered components or as cast or wrought components.

---

This invention relates to a ferrous alloy and to metallic articles made of this alloy. In particular, it relates to such ferrous alloy metallic articles made of powdered metals which have been sintered and subjected to copper liquefication.

It has for one object to provide a ferrous metallic article of sintered powder in which alloy steels with carefully proportioned chemical compositions and microstructures are combined with other non-ferrous powdered metals to obtain a new type of alloy steel.

Another object of the invention is to produce the material described above with optimum combinations of strength, hardness and ductility using the metal powders as raw materials. The metal powders are compacted and subjected to copper liquefication. It is characteristic of the metal described that articles made from it have an ultimate tensile strength extending from 90,000 pounds per square inch to 150,000 pounds per square inch. Articles made from this material are also characterized by tensile elongation varying from 3% at the lower strength to 1% elongation at the ultimate strength of 150,000 pounds per square inch. A Rockwell hardness of the order of C38 is typical of this material and of the articles made from it in the higher strength varieties.

It is recognized that steel and other ferrous alloys have been prepared and are generally known in which copper appears as an alloying element. In molten ferrous alloying, however, because of the immiscibility between molten iron and copper, cast or wrought ferrous alloys with 10% copper content are essentially unknown.

In preparation of the material of this invention, it is characteristic that the ferrous constituents of the alloy are never melted during the process of manufacture which involves, of course, the steps of mixing powdered metal ingredients in chosen proportions, compacting them, sintering them in a process of copper liquefication and, if desired, subjecting them to further heat treatment after cooling from the sintering.

It is another object of the invention to provide a material which is distinguished from cast and wrought products in that it may be shaped directly to the desired form and size of the final article by compaction at room temperature. This is possible because the starting material is metal powder.

A further object of the invention is to produce ferrous alloys and articles made from these alloys which are heat-treatable and which can be produced only by particular combinations of metallic elements and processing operations, including compaction of powders of the elements, sintering and, if desired, subsequent heat treatment. Experience has shown that such alloys and articles made from them cannot be produced by molten alloying. Such alloys and the articles made from them are produced by what is generally identified in the trade today by the expression "powder metallurgy."

The drawings are described as follows:

FIGURE 1 is an autographic stress-strain record of a copper alloyed steel in the as-infiltrated condition. The figure has been constructed around the curve generated by a stress-strain record of an extensometer attached to a tensile test specimen which was broken in tension under load. The composition of the alloy is exactly as described in Example A as was the metallurgical processing, that is, compaction, sintering and infiltration. This means that the nominal composition of the alloy in final form is as follows:

Copper—nominally 15% by weight
Manganese—nominally 0.5% by weight
Nickel—nominally 1.0% by weight
Tin—nominally 1.0% by weight
Carbon—nominally 0.6% by weight
Balance of the alloy being iron of nominally chemical purity In final form before testing, the material of FIGURE 1 was in the "as sintered" condition. The graph demonstrates a gauge length extension of 0.018 inch and a tensile elongation of 1.8%.

The material before testing was heated to 1525° F. and held at this temperature for one and one-half hours for thorough heating. Heating was carried out under a protective gas mixture of $N_2$, CO, $H_2$ with a controlled amount of water vapor. At the end of the heating period, the test pieces were quenched into oil maintained at 130° F. and thereby quickly cooled to this temperature. Upon being withdrawn from the oil, the test pieces were next submitted to a tempering treatment which consisted of a one hour holding period at 350° F.

The graph demonstrates a gauge length extension of 0.011 inch and a tensile elongation of 1.1%

FIGURE 3 illustrates the typical microstructure of a copper alloyed steel in the as sintered condition. The micro structure illustrated is seen at 800 diameters magnification and has been chemically etched with a solution of nitric acid and alcohol in order to produce contrast between the constituents present. The chemical analysis of this structure is identical with that described for FIGURE 1. The constituents present in the microstructure of FIGURE 3 may be described as follows:

The predominant constituent consists of pearlite 1, which is itself composed of alternate laminae of iron carbide ($Fe_3C$) and ferrite (body centered cubic iron). Surrounding these pearlite colonies, the presence of the cuprous constituent containing in solution nickel and tin, primarily for the purpose of strengthening, as well as a saturation amount of dissolved iron (also in solution in the cuprous phase), is clearly visible 2.

FIGURE 4a includes reduced copper oxide 3, milled manganese 4, atomized tin 5, reduced sponge iron 6. The synthetic wax lubricant and natural graphite which are present are found to adhere to the surfaces of the other particles and hence do not show individually in the figures. 7 is the supporting fabric upon which the powders were spread.

FIGURE 4b includes reduced sponge iron 8. As in FIGURE 4a, the synthetic wax and natural graphite are in a condition of adhering to the surfaces of the reduced sponge iron. 9 is the supporting fabric upon which the powder is spread.

FIGURE 5a includes reduced copper oxide 10. All other constituents are in grain boundaries designated 11.

FIGURE 5b includes reduced sponge iron 12. All other constituents are in grain boundary spaces 13. Natural graphite and synthetic wax lubricant have migrated into the grain boundary spaces.

FIGURE 6a includes copper 14, having taken all tin in the solution and recrystalized, iron and manganese remain in grain boundry spaces 15.

FIGURE 7a includes the pearlitic phase 20 and the cuprous phase 21.

FIGURE 7b includes the pearlitic phase 20 and the cuprous phase 21.

Certain voids appear in FIGURES 5a, 5b, 6a, 6b, 7a, 7b, 8 and 9. They are designated in all the figures mentioned as 19.

Figure 1:
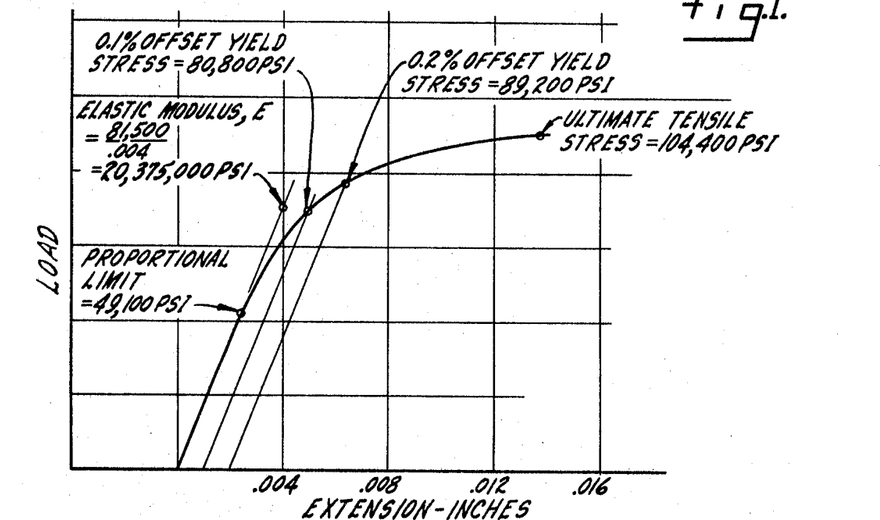
Figure 2:
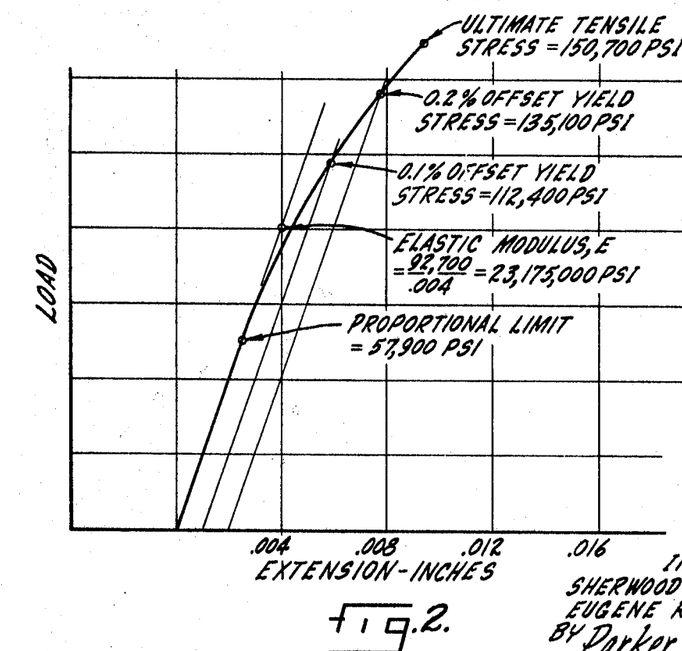
FIGURE 2 is an autographical stress-strain record of a copper alloyed steel in the as-infiltrated and heat treated condition. Processing and composition are exactly identical to those of the material whose graph is shown in FIGURE 1 and heat treatment as follows was carried out.
Figure 3:
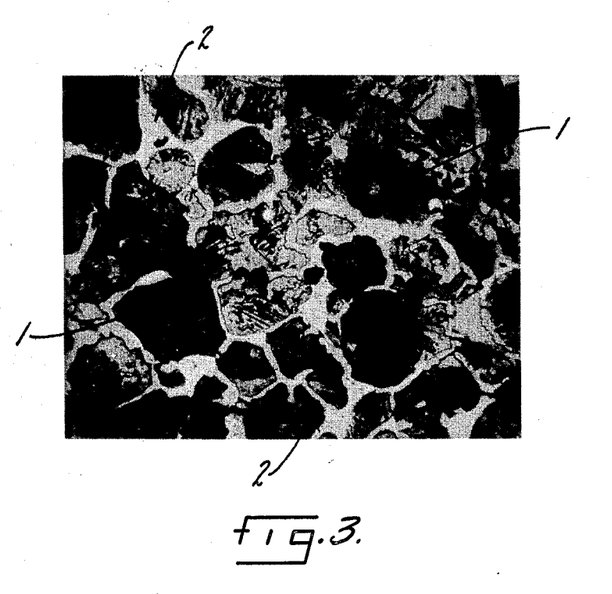
Figure 4A:
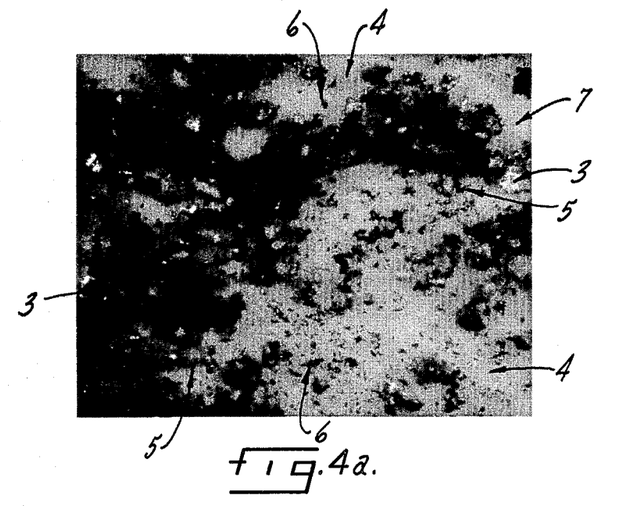
FIGURES 4a and 4b illustrate the powders before compaction.
Figure 4B:
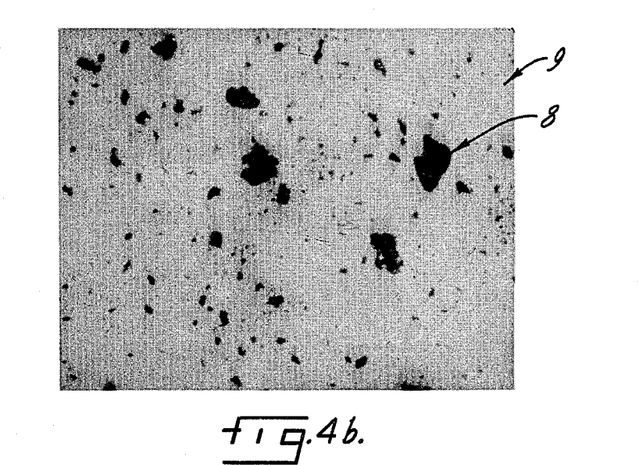
Figure 5A:
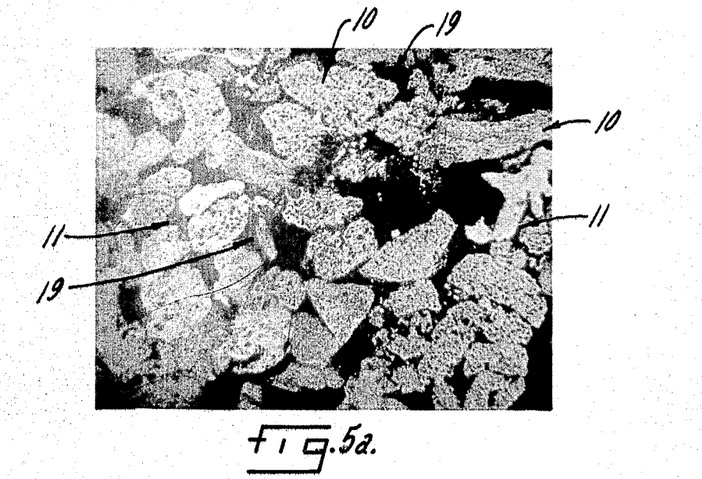
FIGURES 5a and 5b illustrate the grain compacts of the powdered material before heating.
Figure 5B:
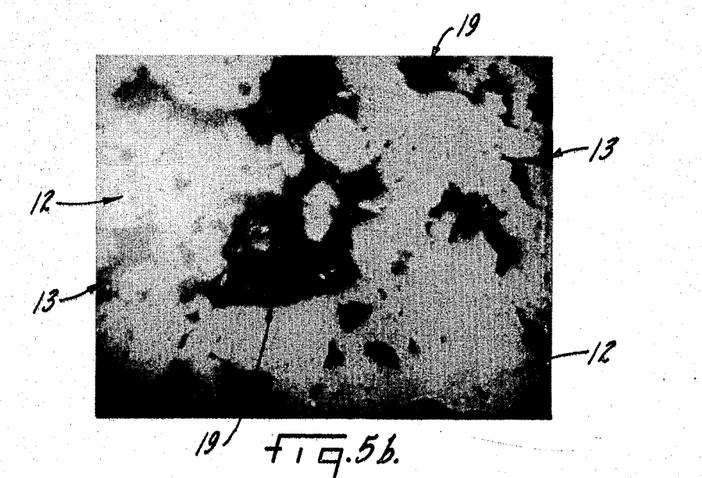
Figure 6A:
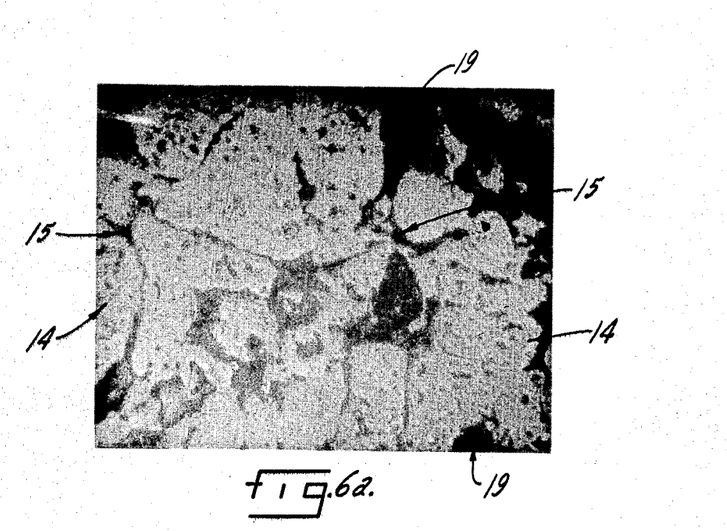
FIGURES 6a and 6b illustrate copper base and iron base briquettes in an early stage of sintering and before liquefication of the alloy components.
Figure 6B:
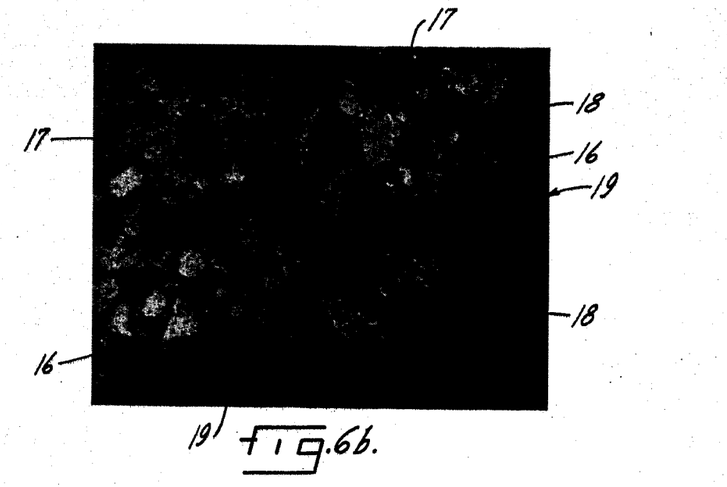
Figure 7A:
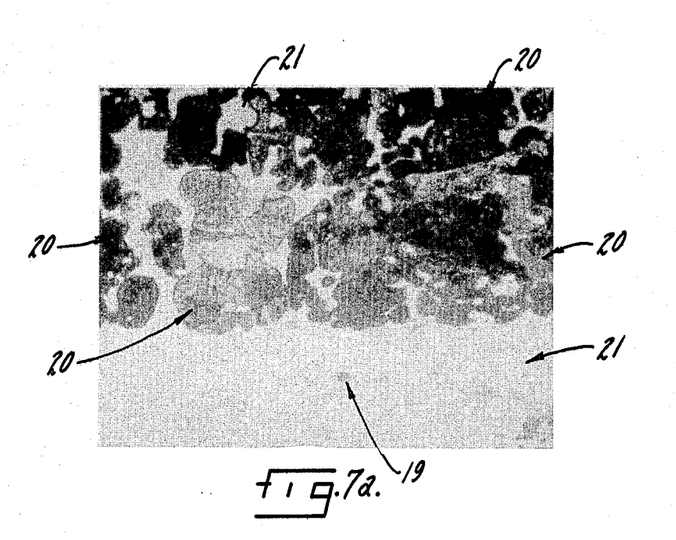
FIGURES 7a and 7b illustrate an iron base briquette with copper alloy in the early stages of copper infiltration.
Figure 7B:
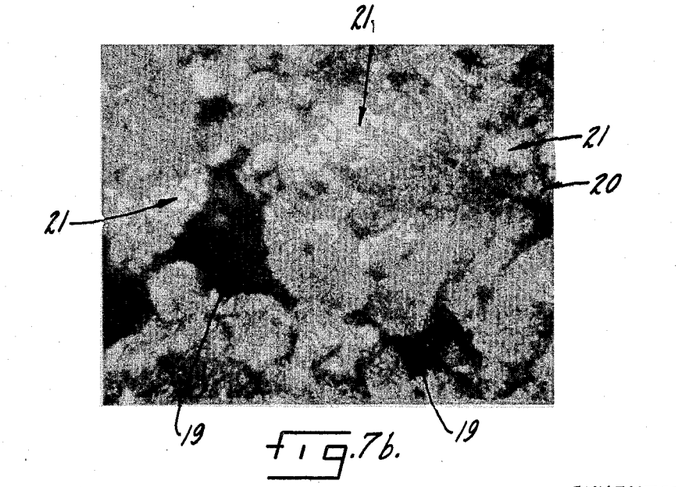
Figure 8:
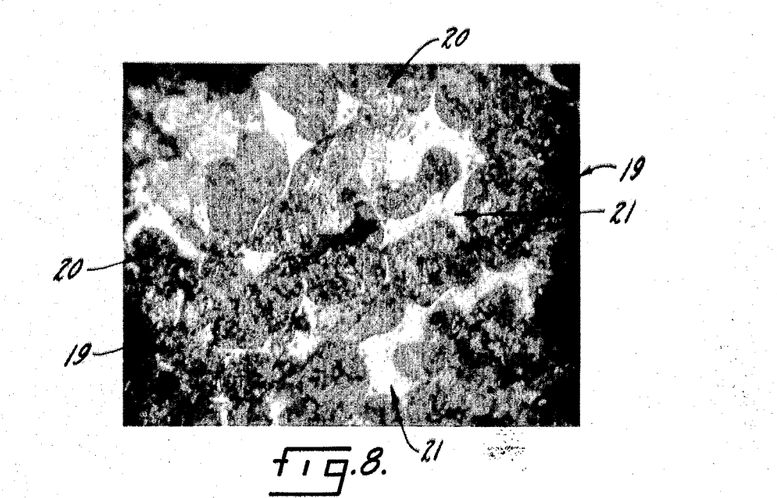
FIGURE 8 illustrates the completely infiltrated iron base briquette. 20 is the pearlitic phase and 21 is the cuprous phase.
Figure 9:
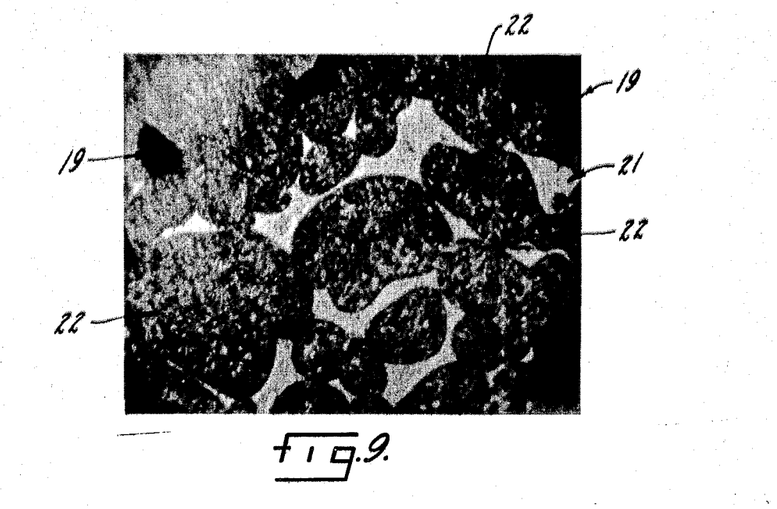
FIGURE 9 illustrates the completely infiltrated and heat treated alloy. 21 is the cuprous phase and 22 is the tempered martensite.

The material of the present invention consists initially of an iron powder which is selected for the purpose of providing basic structural strength. It is modified by the addition of alloying materials which improve its strength and ductility. Among the materials which are added are the following:

(1) Carbon which is alloyed with the iron by a process of solid state diffusion. This causes increased strength and hardness by means of solid solution strengthening, pearlite formation and martensitic hardening or a combination of these.

(2) Copper is alloyed with the iron base material in true liquefication of the copper material only. The ferrous base material is not liquefied. The copper serves the purpose of filling void spaces in the iron matrix and also strengthens the iron by solution and precipitation hardening. The copper itself is further strengthened by dissolving a quantity of iron and by other elements which are mentioned below which affect the copper.

(3) Nickel is, which is a solution hardening element to the copper, present in the product and serves the purpose of increasing the strength and hardness of the copper which is dispersed in the iron voids.

(4) Manganese serves the same purpose as nickel because it is a solution hardening element as well as a precipitation hardening element and is preferably added to assist in promoting infiltration of the copper into the base ferrous material. Manganese also strengthens the iron.

(5) Tin is present to serve as a strengthener of the copper by solution hardening.

(6) Silicon is also preferably added and when present serves as a strengthener of copper by precipitation hardening.

(7) Aluminum is present to add strength to the copper by precipitation hardening.

(8) Chrominum is present to add strength to the copper by precipitation hardening and also to the iron.

The preferred ranges of proportions of the materials mentioned are listed below. Although each of the alloying elements mentioned is known and the effect of each separately is known, the combinations of these elements as listed and for the purposes and results states, create a series of now and useful alloys.

The product of this invention is produced by a method which includes the following steps:

(1) Consolidating separately a ferrous and a nonferrous mass of components in powder form. The nonferrous alloying components include copper and one or more of the other nonferrous components listed above.

(2) These two masses of ferrous and nonferrous materials are thereafter placed in contact with each other and sintered together, preferably in a controlled atmosphere. During sintering, the liquefication of copper occurs and infiltration into the ferrous mass occurs.

(3) Others of the ingredients may be liquified during this step and may be infiltrated into the ferrous compact.

(4) During the sintering cycle, liquid-solid diffusion into the ferrous compact mass occurs.

(5) After the sintering, cooling of the now infiltrated ferrous mass is carried out and solidification of the cuprous phases occurs.

(6) After solidification and cooling, further heat treatment is generally given to the unfiltrated ferrous mass to improve its physical properties.

The metal powders are compacted after suitable mixing to produce the shape and dimensions of the desired final object. Thus if the final object is to be a gear, the ferrous powder is compacted into the final shape and dimensions of that gear. The compaction also brings the powder particles into mutual intimate contact and this promotes efficient sintering when that step is later carried out. The compaction of the metal powder also gives to the compacted article the required strength permitting it to be handled thereafter prior to sintering. It is not essential that the nonferrous compact be of precisely the same shape and dimensions as those of the ferrous compact, but it may conveniently be produced in the same size and dimensions as those of the ferrous compact.

During initial sintering at temperatures of from about 1000° F. to 1750° F., the alloying of the copper with the iron occurs and the alloying of the copper and tin also occurs. These alloying effects occur in the separate compacts which are held in contact with each other in a protective atmosphere to prevent oxidation.

Upon entering the stage of copper liquification in the temperature range of from about 1750° F. to 1981° F., depending upon the alloy selected from those described in this invention, the molten cuprous alloy enters the pore structure of the iron base compact. This pore structure may also be described as the interparticle void spaces between ferrous particles. The copper enters such void spaces in conformance with the basic physical laws of surface tension.

When copper liquefication has proceeded to its maximum extent, the iron base compact pore structure has been essentially filled completely with the liquified copper alloy.

A sintering continues, a differential interchange to produce further alloying of the components tends to proceed. Thus there occurs a partitioning of copper, manganese and nickel, when present, which passes from the molten copper alloy to the ferrous austenitic grains. Carbon also diffuses within the austenite grains and produces a greater degree of homogeneity than which is obtained in the early stages of sintering. Furthermore, the liquid copper at this stage comes approximately into compositional equilibrium with the iron and with the available quantites of tin, nickel, manganese, chrominum, aluminum or silicon in the quantites which may be present in a given mixture.

After having been subjected to a holding period in the copper alloy liquification temperature range, suitably chosen to produce the required degree of diffusion alloying, the alloys of this invention may be cooled to room temperature. Upon cooling below the liquification temperature range for the copper alloy, this cuprous constituent solidifies within the interparticle spaces of the original iron base compact which has become sintered. Upon further cooling through the austenite transformation temperature range from approximately 1650° F. to 1300° F., depending upon the specific composition selected, the high temperature austenite present in the alloy, which was formed during initial heating, is transformed to pearlite consisting of alternate lamellae of body centered cubic ferrite and of $Fe_3C$. Proeutectoid constituents usually are not present.

After being cooled to room temperature, articles shaped from alloys of this invention are essentially in a condition for use. Typical mechanical properties which the alloys exhibit in this condition are from 90,000 to 110,000 pounds per square inch ultimate tensile strength and from 1.5 to 3.0 tensile elongation.

Although the process just described utilizes the simultaneous introduction of both the cuprous and ferrous base components of the alloy into a suitable furnace under protective atmosphere, it should be understood also that the same invention may be practiced by the introduction of the cuprous component into such furnace along with the ferrous component in an already sintered condition. This variation of the process is especially suitable for the manufacture of articles weighing more than five pounds.

The mechanical properties of these alloys may be further enhanced by simple heat treatment. For example, by means of reheating test bars of the alloys to 1500° F., holding at this temperature for one hour, and quenching into oil held at 130° F., the body centered cubic ferritic form of the iron in the as sintered condition is transformed to a face centered tetragonal martinsitic form as will be apparent to those skilled in the art. Upon reheating to 400° F. for one hour precipitation hardening of the cuprous phase occurs. Typical ultimate tensile strengths on the order of 130,000 to 150,000 pounds per square inch with tensile elongations of 0.8 to 1.2 percent may be obtained.

The following examples in which procedures which have actually been carried out successfully are described. In these examples, the results indicated above are achieved.

EXAMPLE A

Step #1

Reduced sponge iron powder of 98.8% purity and 99.9%–100 mesh, 27.0–325 mesh screen analysis was blended with —.75% of Texas natural graphite of 0.7 micron average particle size and 1.0% synthetic amide stearate powder of 5 microns average particle size added as 1.0 weight percent of the total iron and graphite. Mixing was carried out for thirty-five minutes in a blender. 1000 grams of powder were prepared.

Following mixing, six test bars were compacted using the powder just described, using a carbide lined die and hardened steel punches of the required dimensions, placed in a sixty ton capacity hydraulic press. Compacting pressure was twenty-five tons per square inch exerted on the powder. The "green" or as compacted density of each test bar as 6.21 gm./cm.³

Step #2

Reduced copper powder of 99.0% purity and 100%–150 mesh 65%–325 mesh screen analysis was blended with the following additives:

| | Percentage by weight, percent |
|---|---|
| Carbonyl nickel powder 3 micron particle size, 99.9% purity | 6.0 |
| Manganese powder (milled) 100%–100 mesh, 80%–200 mesh screen analysis 99.0% purity | 10.0 |
| Tin powder (atomized), 96%–200 mesh 99.5% purity | 6.0 |
| Reduced sponge iron powder 99.9%–100 mesh, 27.0%–325 mesh 98.8% purity | 5.0 |
| Graphite (natural Texas graphite) 0.7 micron particle size | 5.0 |
| Copper powder as described above | Balance |
| Synthetic amide stearate lubricant, 5 micron particle size, 1% of total. | |

500 grams of this copper base powder mixture were mixed for thirty-five minutes in a blender following which six copper base powder briquettes were compacted using the die, punches, and press already described. The copper base powder briquettes were compacted using a sixteen tons per square inch pressure exerted on the powder, each of the same size and shape as the ferrous compact described in Step #1; each was of 6.6 gm./cc. density.

Step #3

Each of the iron base compacts from Step #1 was covered on the top face with a single copper base briquette from Step #2 to form six two layer laminates. These were in turn placed upon a sixteen mesh stainless steel screen which had been oxidized previously. The sets of laminates carried on the screen were thereafter placed on the alloy mesh belt traveling hearth of a high temperature refractory lined furnace. The furnace used had two internal temperature zones each controlled separately, through which the traveling mesh belt hearth already mentioned conveyed the laminates or work pieces to be heated. The traveling mesh belt hearth was eighteen inches wide. The furnace selected was continuously purged with a 20% CO, 40% $H_2$, 1.0% $CH_4$, 1.0% $CO_2$, 0.2% $H_2O$, 37.8% $N_2$ gas mixture flowing at a rate of 2,000 c.f.h. to prevent either oxidation or decarburization of the laminated work pieces passing through the furnace.

The laminated workpieces, placed upon a screen, as described, were carried through the first temperature zone of this furnace which was held at 1500° F. This first zone was four feet long. The belt moved at a speed rate of four inches per minute and continued through the second temperature zone of the furnace, which was held at 2075° F. and was also four feet long at the same speed. Each laminated work piece thus experienced approximately twelve minutes heating at 1500° F., followed by twelve minutes heating at 2075° F. under the protective atmosphere described. Upon leaving the second heating zone of the furnace, the laminates entered a cooling section which returned the laminates to room temperature in thirty minutes while they were held under protective atmosphere.

The metallurgical changes brought about during this furnace cycle within each of the laminates is stated below. These were in a sequence as follows:

During passage through the 1500° F. temperature zone, all amide stearate lubricant was evaporated from the laminates which in turn were brought to 1500° F. Within the copper base briquettes, tin melted and next dissolved into the solid copper powder grains. Some limited sintering of the copper grains may have occurred also at the 1500° temperature.

Upon sintering in the 2075° F. furnace temperature zone, body centered cubic ferrite iron present in the iron base compact transformed to face centered cubic austenitic iron upon being heated through 1670° F. and at the same time began to dissolve graphite, partly by means of CO acting as a carrier gas between austenitic iron and graphite particle surfaces. Sintering between adjacent austenite iron grains began at this stage also. At approximately 1800° F., the tin saturated copper began to melt and thereupon commenced to dissolve the nickel, manganese and iron contained in the copper base briquette. The liquid copper alloy so formed thereupon penetrated the pore structure of the iron base compact under the influence of surface tension as a basic driving force. In this process of liquefication, approximately three-quarters of the manganese content and one-half of the nickel and tin content of the copper alloy formed were oxidized by the water content of the furnace atmosphere to form an oxide dross which remained on the surface of the iron base compact until brushed off. As heating continued through the full 2075° F. temperature, approximately 70% of the graphite content of the iron base compact became dissolved in austenitic iron, the balance of graphite being largely lost to oxidation. Likewise, a saturation amount of copper dissolved in the austenite, while excess copper-nickel-tin-manganese alloy remained in the intergranular spaces of the original iron compact.

Upon exciting from the 2075° F. temperature zone and cooling below approximately 1800° F., the copper-nickel-manganese-tin-iron alloy which had infiltrated the iron base compact pore structure solidified. Upon further cooling through approximately 1300° F., the carbon saturated austenitic iron transformed to a pearlitic mixture of $Fe_3C$ and ferritic iron to produce the desired end microstructure consisting of a high strength copper-nickel-manganese-tin bronze dispersed in the intergranular regions of a fully pearlitic copper saturated steel.

Step #4

The final density of the alloy steel test bars of Step #3 was 7.5 gm./cc. The six bars were each tested individually to the breaking point in bending over a 1.0 inch span having a single load applied at the center. The average outer fiber test stress at breaking was 165,900 pounds per square inch average for the bars. Deflection at the point of breaking was 0.013 inch.

In terms of equivalent tensile properties, these values amount to 80,000 pounds per square inch ultimate tensile strength with 1.3% tensile elongation.

EXAMPLE B

Step #1

Step #1 in Example B was identical to Step #1 for Example A, except that the graphite content of the iron compacts was maintained at 0.35%.

Step #2

Step #2 in Example B was identical to Step #2 for Example A, except that the composition of the copper base briquettes was modified by omitting manganese and iron powder from the copper base briquettes. 5% atomized aluminum powder of 99.9% purity and 100%-100 mesh screen analysis was substituted.

Step #3

Step #3 in Example B was carried out in essentially the same procedure as for Step #3 for Example A but omitting manganese reactions. Upon cooling below 1300° F., the final structure consisted of a high strength copper-nickel-tin-aluminum bronze dispersed in the intergranular regions of a fully pearlitic copper saturated steel.

Step #4

Step #4 in Example B is essentially the same as Step #4 for Example A with these exceptions:

The final density of the alloy steel test bar was 7.62 gm./cc., outer fiber stress at the breaking point was 203,103 pounds per square inch, and the total deflection was 0.032 inch. These properties are equivalent to 101,000 pounds per square inch ultimate tensile strength and 3.2% tensile elongation.

EXAMPLE C

Step #1

In the blending procedure of the iron base composition, the steps were as described in Examples A and B as described above and the graphite content was 1.0% of the total. Instead of test bars as used and tested in Examples A and B, ASTM tensile test specimens according to the specification E8-61T (Tensile Testing) were compacted to 6.6 gm./cc. "green" density. These specimens have a flat projected cross-section area of 1.00 square inch and are designed to present a 1.00 inch long gauge length, 0.225 inch wide. Each specimen weighed 27.1 grams. Twelve compacts were made.

Step #2

The composition and blending procedure for the copper base compacts or briquettes were the same as described for Step #2 of Example A. These briquettes were compacted in the tensile bar die described in Step #1 for Example C set out above to 6.6 gm./cc. density. Twelve briquettes were made.

Step #3

All the procedures were the same as for Step #3 of Example A except that iron base compacts were of 6.6 gm./cc. density and were of tensile bar shape, as were the copper base briquettes.

Step #4

The twelve copper alloy steel test bars obtained were of 7.55 gm./cc. density. Three were tensile tested as infiltrated, the remaining nine bars were heated to 1500° F., quenched in oil and then temperated one hour in air at temperatures of 400° F., 800° F. and 1200° F. in sets of three. Tensile properties obtained in standard tests were as follows:

| Tempering temperature or condition | Ultimate tensile strength (p.s.i.) | Tensile elongation |
|---|---|---|
| None, as infiltrated | 119,000 | 1.0 |
| As quenched | 90,106 | 0.4 |
| Tempered 400° F | 123,586 | 0.7 |
| Tempered 800° F | 137,846 | 0.8 |
| Tempered 1,200° F | 102,501 | 3.0 |

EXAMPLE D

Step #1

Step #1 for Example D was identical to Step #1 for Example C except that the iron base compacts contained 0.7% graphite.

Step #2

Step #2 for Example D was identical to Step #2 for Example C except that nickel and tin were omitted from the copper base briquettes.

Step #3

Step #3 was identical to Step #3 of Example C.

Step #4

The procedure of Step #4 for Example D was identical to that for Step #4 of Example C. The following tensile results were obtained:

| Tempering temperature or condition | Ultimate tensile strength (p.s.i.) | Tensile elongation |
|---|---|---|
| None, as infiltrated | 150,000 | 1.2 |
| As quenched | 117,919 | 0.8 |
| Tempered 400° F | 150,721 | 1.0 |
| Tempered 800° F | 125,557 | 0.7 |
| Tempered 1,200° F | 94,767 | 3.0 |

Other experiments have shown that aluminum may be substituted for all or part of the manganese content of the copper briquettes described in Step #2 of the preceding Examples A, B, C and D. Silicon has also been substituted for all or part of the manganese. Results of these experiments indicate that exactly similar aluminum-nickel-manganese-tin and silicon-nickel-manganese-tin bronzes may be obtained as strengthening microconstituents in structural alloy steels of the type described herein.

Further modifications in the process may include the following steps:

(1) Sintering under vacuum for more complete penetration of cuprous alloy into the ferrous pore structure.

(2) Vibrational compaction of the ferrous and cuprous members as distinct from press compaction.

(3) Vibrational compaction with pressure of the ferrous and cuprous members as distinguished from press compaction alone.

(4) The use of surface active agents to assist penetration of the cuprous phase into the ferrous pore structure.

Whereas the preferred form of the invention has been described and illustrated, it should be realized that there are many modifications, substitutions and alterations thereto within the scope of the claims.

What is claimed is:

1. In the method of making a copper containing alloy steel article, the steps of
mixing iron powder and carbon powder capable of alloying with the iron powder,
compacting said iron powder and carbon powder,
mixing copper powder and a first metallic powder which will provide a solid solution hardening effect on the copper and a second metallic powder which will provide a precipitation hardening effect on the copper,
compacting said non-ferrous powders, and
thereafter at least partially sintering the iron-carbon compact and completely infiltrating said iron-carbon compact with the non-ferrous compact by the application of heat.

2. In the method of making a ferrous base article, the steps of
mixing iron powder and carbon powder capable of alloying with the iron powder,
compacting said iron and carbon powders,
forming a copper powder mixture by mixing copper powder and two or more metallic powders,
the first powder providing a solid solution hardening effect on the copper and being selected from the group consisting essentially of Ni, Sn, Mn, and Fe,
the second powder providing a precipitation hardening effect on the copper and being selected from the group consisting essentially of Si, Al, Cr, Mn, and Fe, said copper powder mixture, when containing Mn and Fe, also contains one of the other named powders,
compacting said non-ferrous powders,
thereafter at least partially sintering the iron-carbon compact and completely infiltrating said iron-carbon compact with the non-ferrous compact by the application of heat.

3. The method of claim 2 further characterized in that the non-ferrous powder mixture includes carbon.

4. The method of claim 2 characterized by the step of completely sintering the iron and carbon powders prior to their infiltration by the non-ferrous powders.

5. The method of claim 2 further characterized by the step of
sintering the non-ferrous compact prior to infiltrating the ferrous compact.

6. The method of claim 2 characterized by the fact that the copper powder mixture includes manganese and one or more powders selected from the group consisting essentially of Sn, Si, Fe, C, Al and Cr, said copper powder mixture when containing Fe and C, also contains one of the remaining named powders.

7. The method of claim 2 further characterized by the fact that the proportions of elements in the non-ferrous compact are so selected that
the final copper content is about 10% to 25% by weight and that the other non-ferrous metallic elements, when present, are present in the final product in the following amounts manganese about 0.05 to 5.0 percent
aluminum about 0.05 to 5.0 percent
tin about 0.05 to 5.0 percent
silicon about 0.005 to 2.0 percent
nickel about 0.05 to 5.0 percent.

8. The method of claim 2 further characterized by the fact that the infiltration of the ferrous compact by the non-ferrous compact is carried out under a protective atmosphere a a first temperature which at least partially liquifies the non-ferrous elements and thereafter at a higher temperature which induces infiltration of the iron-carbon compact.

9. The method of claim 2 further including the steps of changing the body centered cubic ferritic form of the iron to a face centered tetragonal martinsitic form by heat treatment subsequent to infiltraion followed by
heating to a temperature not less than about 300° F. until precipitation hardening of the cuprous phase occurs.

References Cited

UNITED STATES PATENTS

| | | | |
|---|---|---|---|
| 2,561,579 | 7/1951 | Lenel | 75—208 X |
| 2,778,742 | 1/1957 | Shipe | 29—182.1 X |
| 2,789,901 | 4/1957 | Shipe | 29—182.1 X |
| 3,120,436 | 2/1964 | Harrison | 15—200 |
| 3,326,678 | 6/1967 | Talmage | 15—200 X |
| 3,332,774 | 7/1967 | Tuttle | 15—208 X |
| 3,343,954 | 9/1967 | Brab | 15—208 |

FOREIGN PATENTS

| | | |
|---|---|---|
| 252,771 | 7/1964 | Australia. |
| 547,133 | 10/1957 | Canada. |
| 658,335 | 10/1051 | Great Britain. |

CARL D. QUARFORTH, Primary Examiner

A. J. STEINER, Assistant Examiner

U.S. Cl. X.R.

29—182; 75—201, 214; 148—126